March 1, 1955
C. O. G. PERSSON
2,702,943
DEVICE FOR CURING AND TURNING CHEESE
Filed May 27, 1952
3 Sheets-Sheet 1
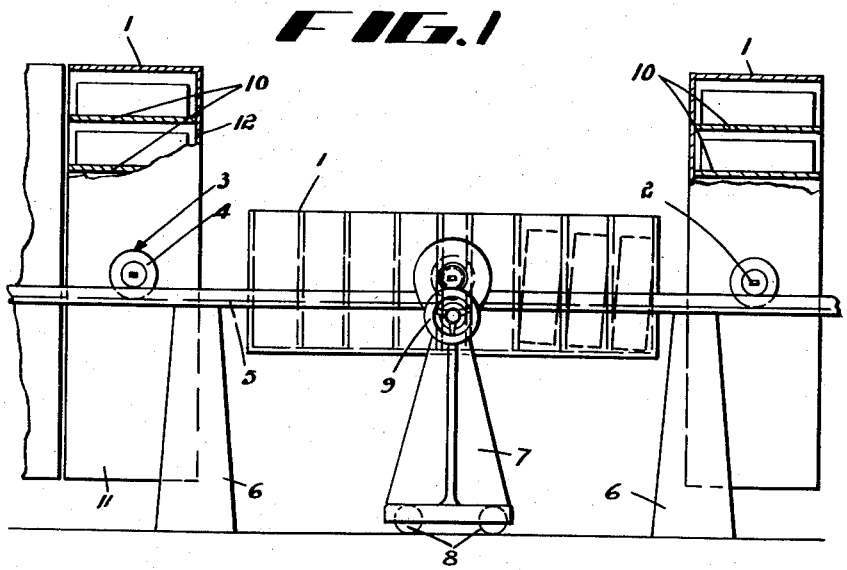
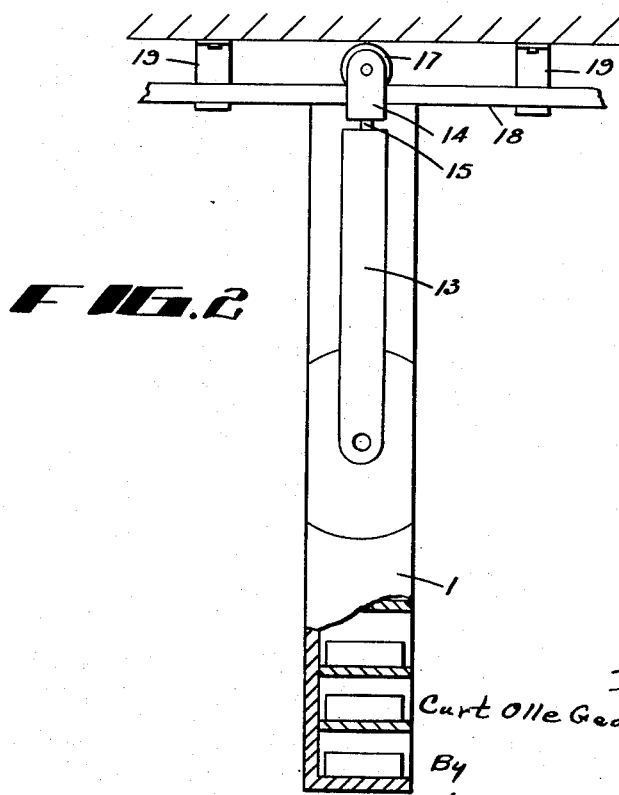
Inventor
Curt Olle Georg Persson
By Henderoth, Lind & Ponack
Attorneys.

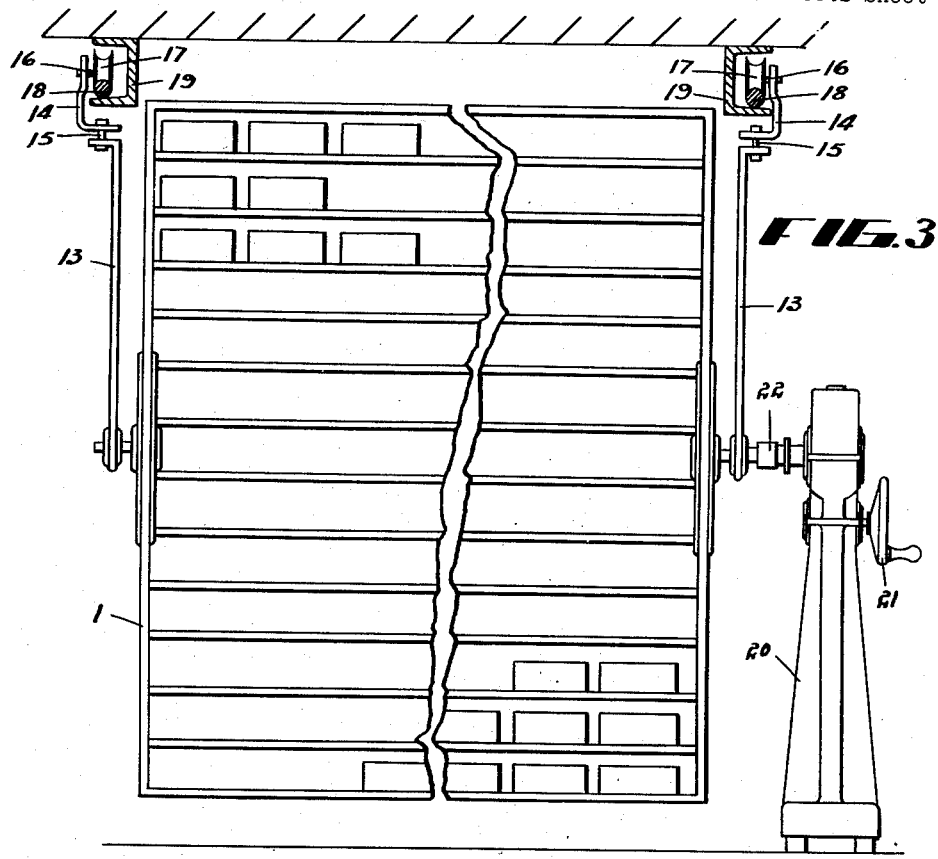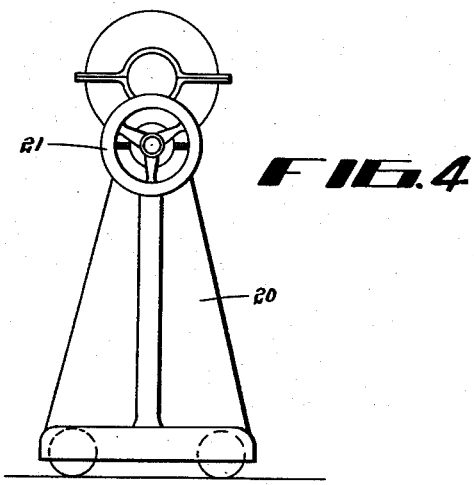

March 1, 1955     C. O. G. PERSSON     2,702,943
DEVICE FOR CURING AND TURNING CHEESE
Filed May 27, 1952     3 Sheets-Sheet 3
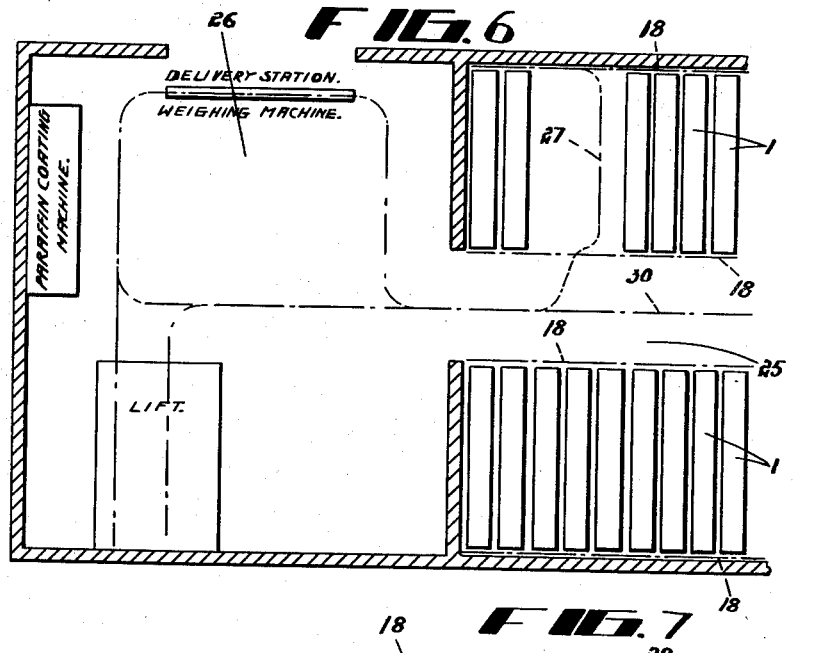
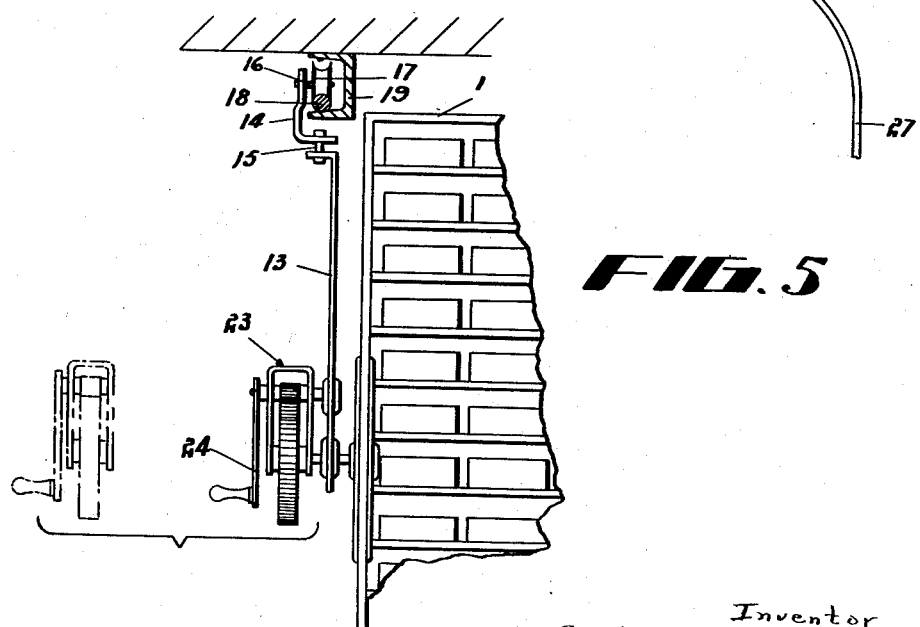

United States Patent Office 2,702,943
Patented Mar. 1, 1955

2,702,943

DEVICE FOR CURING AND TURNING CHEESE

Curt Olle Georg Persson, Halmstad, Sweden

Application May 27, 1952, Serial No. 290,233

2 Claims. (Cl. 31—49)

In the curing of cheese that takes place after the pressing thereof in order that the cheese may ripen, the cheeses have to be turned from time to time, as is well known. The cheeses have hitherto usually been turned by hand, an operation which has therefore been associated with a great consumption of labour and required big curing-rooms with shelf frames disposed in parallel but a relatively large distance apart in order that there might be left a passage between every two of the shelf frames so that the shelves could be reached from both sides.

Devices for curing and turning cheese are however known already. Said devices comprise shelf units, each of which has one side (the back) closed by means of a wall, but is open on the opposite side (the front), and is so suspended as to be swingable about a horizontal axis passing through the centre of gravity of the respective shelf unit longitudinally of the shelves by means of axles projecting from the end walls of the shelf units and carried on supports at opposite sides of the shelf units.

With the use of such devices relatively small shelf units which are assembled, together with their supports, in a common frame can be turned either in several steps or all at a time so that one does not need to turn each cheese or even touch it with one's hands. For this purpose, however, rather complicated mechanisms are needed and in large cheese stores employing several shelf frames a large floor space is required for said frames in order that the shelf units mounted in said frames may have sufficient room for enabling turning thereof.

The object of the invention is to provide a device of the above kind which considerably facilitates turning of the cheeses by simple means so that one does not have to touch them with one's hands, and furthermore permits a better utilization of the storing space which is available in each particular case. The characteristic features of this device are that each of the shelf units includes a number of vertically spaced-apart shelves and is movably carried with the aid of mounting means, in which the axles or pivots are mounted, by the supporting means formed by parallel horizontal rails to allow movement of each shelf unit along the rails, and that the height of the rails above the floor and the distance of the axles or pivots from the rails are so interrelated that the shelf units will hang freely without touching the floor, whereby they can be pulled out along the rails one at a time from a position in which they are juxtaposed for curing the cheeses, and be completely reversed for turning the cheeses.

The invention will be more fully described in the following, reference being had to the accompanying drawings illustrating several embodiments of the device according to the invention. In the drawings:

Fig. 1 shows a first embodiment in side elevation and partly in section.

Fig. 2 shows a second embodiment in side elevation and partly in section.

Fig. 3 shows the same embodiment in an elevation taken at right angles to that in Fig. 2 with a gear turning unit applied.

Fig. 4 shows in an elevation of a separate gear unit for use in connection with the device according to Figs. 2 and 3.

Fig. 5 shows an elevation, seen from the same side as that in Fig. 3, of a part of a third embodiment which is a modification of Fig. 3.

Fig. 6 is a plan of a cheese curing house to which the invention is applied.

Fig. 7 shows a detail of the installation in Fig. 6.

The device consists of a number of shelf units 1 which are suspended on horizontal shafts which pass through the centres of gravity of the respective shelf units 1 longitudinally of the shelves and have their axles 2 projecting from the end walls of the shelf units and mounted in roller supports 3 including rollers 4 supported on two parallel rails 5 along which the roller supports are thus displaceable. The rails 5 are placed on concrete supports 6 or the like of such an equal height that the shelf units will hang freely between the rails without touching the floor.

A separate gear unit 7 which is supported on wheels 8 so that it may be propelled on the floor along the rails 5 can be coupled by means of a coupling sleeve (not shown in Fig. 1) to one outer square end of the axle 2 of each shelf unit. The gear unit 7 is provided with a hand wheel 9, and by operating said wheel the shelf units may be swung by hand through half a revolution. In order that the gear unit 7 may stand stably during the turning of a shelf unit, the turning should be performed adjacent one of the concrete supports 6.

The shelf units 1 are assembled each of a number of vertically spaced-apart shelves 10 which are interconnected by means of end wall members 11 and a rear wall member 12 which covers the entire back. The front of the shelf units is, however, open. The distance between the shelves 10 shall be chosen with due consideration of the thickness of the cheeses to be cured on the shelves so that said distance is only somewhat larger than said thickness.

The shelf units 1 filled with cheeses should be located close to each other as is shown to the far left in Fig. 1, the open front of each unit being covered by the back of the adjacent unit. The front of the foremost unit can possibly be covered with a special removable plate in order that the whole collection of shelf units may form a closed whole. As a result, the cheeses are protected against rats and mice which otherwise cause great losses to cheese stores. When the cheeses are to be turned the foremost shelf unit is pulled out a suitable distance along the rails 5 so that it can be swung about the axles 2 through half a revolution, as is shown in the middle of Fig. 1. During this operation the cheeses are transferred to the shelves 10 which were earlier located above them, the cheeses being automatically turned. By so turning the cheeses they are treated more tenderly than when turned one at a time by hand, which often results in chipping. On account of the cheeses on the lower half of each shelf unit being on an average at a greater distance from the shaft than the cheeses on the upper half, the shelf units will always hang in a stable position of balance. Then the shelf unit is moved on along the rails 5 as long as they extend, whereupon the next unit is pulled out, turned and moved on, until it abuts the first unit. This is repeated until all shelf units 1 have been turned and lie closely adjacent again. In each turning operation the assembly of shelf units is moved from one side of the curing-room to the other. It is evident that to permit turning of the shelf units the rails 5 have to be at least as much longer than the total depth of all units as the height of a shelf unit. The rails may be extended to enter paraffining and loading rooms so that the shelf units may be moved into said rooms at the end of the curing period, whereby further labour is saved.

The embodiment of the device shown in Figs. 2 to 4 comprises shelf units 1 of the same kind as in the preceding embodiment. Each shelf unit 1 is mounted with its axles 2 in the lower ends of two rod-shaped or plate-shaped roller supports 13. At the upper end of each roller support 13 a bracket 14 is provided having a swivel connection with the roller support by means of a vertical pivot 15. This bracket 14 has a horizontal pin 16 fixed to it on which a roller 17 is rotatably mounted. The shelf unit 1 as a whole is movably suspended by means of the two rollers 17 on two rails 18 consisting of round bar iron and mounted on a suitable number of supports 19 which are secured to the ceiling of the curing room. Thus the shelf units 1 may be displaced along the rails 18, the length of the roller supports 13 being so dimensioned, that the shelf units will hang freely without touching the floor. As in Fig. 1, the turning of the shelf units is performed with the aid of a separate wheeled gear unit 20 (see Figs. 3 and 4) which is provided with a crank 21 and may be coupled to the outer end of one axle 2 of each shelf unit by means of a coupling sleeve 22.

The modification of the device shown in Fig. 5 comprises shelf units 1 and roller supports of the same construction as in Figs. 2 and 3, except for the fact that one plate-shaped roller support 13a carries a gear unit 23 connected with the axle of the shelf unit and having a crank 24. This gear unit 23 is preferably removable, as indicated by dash lines, so that it may be moved from one shelf unit to the next one at the turning operation.

Devices in which the rails are mounted in the ceiling are advantageous from the point of view that the rails do not obstruct the entrance to two moved-apart shelf units.

Fig. 6 illustrates the application of the device according to the invention, more particularly the embodiment of Figures 2–4, to a cheese curing house comprising a cheese storing room 25 and a paraffin coating and cheese delivery room 26. The storing room 25 includes two rows of shelf units 1, each row having its own pair of rails 18. As shown in respect of one row, a single transverse rail 27 is associated with the pair of rails 18, so that a shelf unit 1 may be transferred to said rail 27 for movement laterally along the same. To enable said transfer to be made switch means are provided between each rail 18 and the transverse rail 27, the switch means for insertion in the upper rail 18 adjacent rail 27 being shown in Fig. 7, comprising a rail section 28 normally forming a part of the rail 18 but linked with one end to the adjoining section of said rail, and a curved end portion 29 of said transverse rail 27, to which said rail section 28 may be switched over when it is desired to transfer a shelf unit to the transverse rail 27. The swivel connection between each roller support 13 and the associated bracket 14 permits the transfer of the shelf unit to be made without changing its angular position. A central rail 30 is provided as a means of transporting the shelf units 1 from the storing room 25 to the delivery room 26 and vice versa. In the latter room further rails are provided for transporting the shelf units to a paraffin coating machine and to a weighing machine and delivery station and, if desired, to a lift, switch means being provided where required.

Although suitable embodiments of the invention have been described above it is evident that the invention is not limited thereto inasmuch as various other modifications may be resorted to.

What I claim and desire to secure by Letters Patent is:

1. An installation for curing and turning cheese, comprising a number of shelf units each including a number of vertically aligned relatively fixed elongated shelf members for receiving cheeses, said units being disposed in a parallel relation with the back of one unit facing the front of another unit, pivot means provided at opposite ends of each of said units in alignment on a horizontal axis passing through the center of gravity of the unit, a couple of travelling dependent suspension arms for each shelf unit provided one at either end of said unit for supporting the same by said pivot means to allow inversion thereof about said horizontal axis, brackets pivotally mounted about vertical axes on the upper ends of said suspension arms, roller members mounted on said brackets, a couple of spaced horizontal parallel rail means suspended from the ceiling at an equal level above the level of said pivot means and extending at right angles to a vertical plane through said axis for supporting said roller members on said rail means to allow movement of said suspension arms and the associated shelf unit along said parallel rail means, the height of said rail means above the floor level and the spacing of said pivot means from said rail means being interrelated so as to allow the shelf units to be suspended freely above said level, and single rail means suspended from the ceiling at the same level as said parallel rail means and including transverse rail means associated with said parallel rail means and transport rail means in extension of said transverse rail means.

2. An installation for curing and turning cheese, comprising a number of shelf units each including a number of vertically aligned relatively fixed elongated shelf members for receiving cheeses, said units being disposed in a parallel relation with the back of one unit facing the front of another unit, pivot means provided at opposite ends of each of said units in alignment on a horizontal axis passing through the center of gravity of the unit, a couple of travelling dependent suspension arms for each shelf unit provided one at either end of said unit for supporting the same by said pivot means to allow inversion thereof about said horizontal axis, brackets pivotally mounted about vertical axes on the upper ends of said suspension arms, roller members mounted on said brackets, a couple of spaced horizontal parallel rail means suspended from the ceiling at an equal level above the level of said pivot means and extending at right angles to a vertical plane through said axis for supporting said roller members on said rail means to allow movement of said suspension arms and the associated shelf unit along said parallel rail means, the height of said rail means above the floor level and the spacing of said pivot means from said rail means being interrelated so as to allow the shelf units to be suspended freely above said level, single rail means suspended from the ceiling at the same level as said parallel rail means and including transverse rail means associated with said parallel rail means and transport rail means in extension of said transverse rail means, and switch means for transferring said shelf units from said parallel rail means to said transverse rail means and vice versa.

References Cited in the file of this patent

UNITED STATES PATENTS

| Number | Name | Date |
|---|---|---|
| 215,407 | Stettler | May 13, 1879 |
| 457,604 | Irons | Aug. 11, 1891 |
| 496,184 | Bowley | Apr. 25, 1893 |
| 586,410 | Woods | July 13, 1897 |
| 1,480,233 | Oberstadt | Jan. 8, 1924 |
| 2,304,578 | Leisenheimer | Dec. 8, 1942 |
| 2,567,957 | Miollis | Sept. 18, 1951 |